United States Patent [19]

Snyder et al.

[11] Patent Number: 4,899,793
[45] Date of Patent: Feb. 13, 1990

[54] DUPLICATING SYSTEM FOR A LATHE

[75] Inventors: Steven A. Snyder, Spring Valley; Jack Smith, Huber Heights; David D. Flora, Arcanum; Robert L. Bartlett, Dayton, all of Ohio

[73] Assignee: Shopsmith, Inc., Dayton, Ohio

[21] Appl. No.: 334,790

[22] Filed: Apr. 10, 1989

Related U.S. Application Data

[60] Continuation of Ser. No. 483, Jan. 5, 1987, abandoned, which is a division of Ser. No. 875,433, Jun. 17, 1986, Pat. No. 4,694,713.

[51] Int. Cl.$^4$ .................. B23B 3/28; B23B 29/12
[52] U.S. Cl. ................................ 142/7; 82/158; 82/161; 142/49; 407/82; 407/87; 407/97; 407/99
[58] Field of Search .................... 407/81–84, 407/87, 89, 96, 97, 99, 101, 103, 112; 279/83; 408/181, 185; 82/154, 158, 161, 11.1; 142/7, 48–49, 55–57, 38

[56] References Cited

U.S. PATENT DOCUMENTS 4,628,975 12/1986 Horn .......................... 142/7

Primary Examiner—Kenneth J. Ramsey
Attorney, Agent, or Firm—Biebel, French & Nauman

[57] ABSTRACT

A duplicating system, especially for use with a multi-purpose woodworking machine capable of performing lathe turning operations. The system includes a support table, a carriage adapted to be slidably mounted on the machine, and a locking rack and pinion for raising and lowering the table relative to the carriage. A tool support is positioned on the table and includes a base having a low friction pad for engaging the table top, a follower for contacting a pattern, and a multi-edge cutting tool rotatably mounted on a tool rod for engaging a workpiece. An insert guide is mounted on the tool rod to hold the cutting tool in position. The base has a set screw which engages a circumferential groove in the shank of the tool rod so that the cutting tool can be quickly and accurately positioned relative to the follower. The system also includes a pattern support frame which includes a channel, a pair of stanchions for attaching the channel to the machine above the workpiece, and a pair of brackets which are slidably adjustable along the channel and include clamps for engaging a flat template and spindles for engaging a three-dimensional model. The clamp is adapted to hold a template either parallel to or perpendicular to the axis of the workpiece for spindle or face plate turning, respectively. The channel also supports an adjustable chip shield.

12 Claims, 8 Drawing Sheets

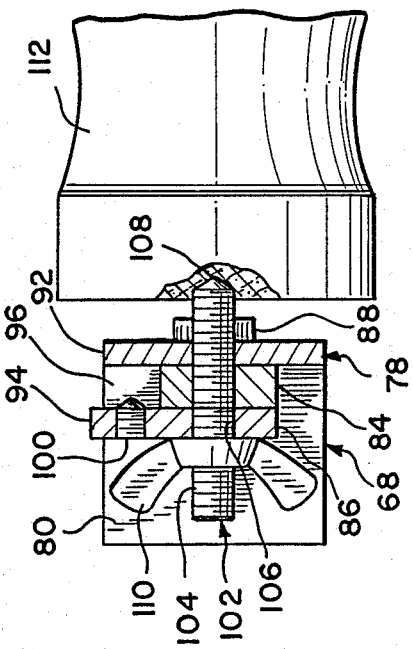

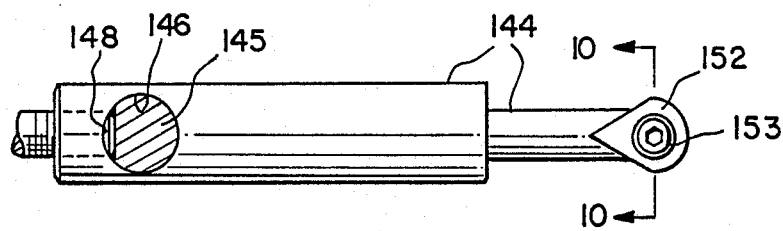
FIG-9
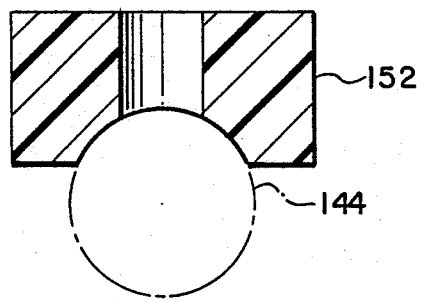
FIG-10
FIG-8
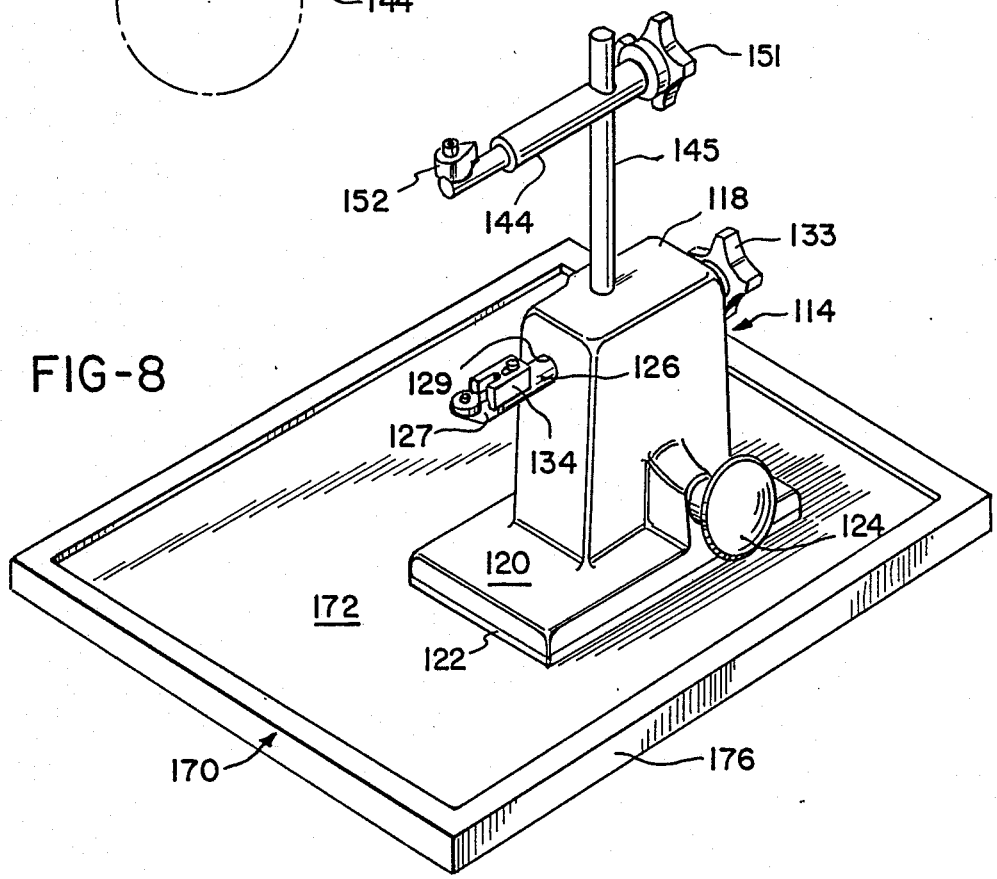

DUPLICATING SYSTEM FOR A LATHE

This is a continuation of co-pending application Ser. No. 000,483, filed Jan. 5,1987, abandoned, which is a divisional of application Ser. No. 875,433 filed June 17, 1986, now U.S. Pat. No. 4,694,713.

BACKGROUND OF THE INVENTION

The present invention relates to methods for making duplicate parts during lathe turning operations and, more particularly, for a system attachable to a multipurpose woodworking tool for holding a pattern and cutting a duplicate part in a lathe turning operation.

A lathe typically includes a headstock having a motor-driven quill spindle and drive center for engaging the end of a workpiece, a tailstock having a center for engaging an opposite end of a workpiece, a tool rest for supporting a tool, and a frame for supporting the headstock, tailstock, and tool rest. This type of lathe, in which the workpiece is held between centers, is used to perform "spindle turning" to make such items as legs for tables, chairs, and beds. Lathes are also used to turn bowls, goblets, and the like in a procedure called "face plate turning". In this procedure, the pointed centers are removed from the headstock and tailstock, and the headstock drive center is replaced with a disc-shaped face plate which is screwed to a scrap block that, in turn, is removably attached to the workpiece to be turned.

It is frequently necessary to turn a large number of identically-shaped pieces on a lathe, and such an operation is performed most efficiently by the use of a lathe duplicator. A lathe duplicating system is shown in the Hochstatter et al. U.S. Pat. No. 4,256,155, and includes a frame having a motorized headstock, displaceable tailstock, and a horizontal table extending between the headstock and tailstock. A cutting tool is mounted on a tool holder that is freely slidable on the table. The tool holder also includes a follower which engages the contours of a model supported by brackets mounted on the table. The brackets include a clamp which is adapted to engage a flat template, and may be modified to receive bracket extensions having spindles for holding a three dimensional model to be duplicated.

In operation, the pattern to be duplicated—in the form of a flat template or a three-dimensional model—is mounted on the brackets, and the tool holder is moved along the support surface so that the follower traces the contour of the pattern. At the same time, the cutting tool engages the rotating workpiece and removes material to form a contour corresponding to that of the pattern. Since the tool holder is freely movable along the supporting surface, such lathe duplicating systems are capable of duplicating intricate patterns which may include negative or reverse curvatures. Such systems are known as "free foot" duplicators.

Another example of a free foot duplicator is shown in the Messick U.S. Pat. No. 3,768,527. With that system, the flat table top is slidably positionable beneath the headstock and tailstock of the associated lathe, and includes a slot which is shaped to receive the downwardly-extending lip of a template having the pattern to be duplicated. Models are held between the adjustable spindles of brackets attached to opposite ends of the table top. The tool holder includes a low friction base for sliding on the table top, a follower which is adjustably attachable to the base, a second follower which is adjustably positionable along an upright post extending from the base, and a cutting tool support which is adjustably attached to the top of the post.

In both of the aforementioned devices, the template or model to be duplicated is positioned below the rotational axis of the headstock and therefore below the spinning workpiece. The disadvantage of this arrangement is that the maximum diameter of the workpiece is somewhat limited since a portion of the space between the rotational axis and the support surface for the tool holder is occupied by the template or model.

Another disadvantage with the aforementioned systems is that the templates must be specially modified in order to be attached to the support brackets. With the system of Hochstatter et al., the template must have parallel slots formed in its ends, and with the system of Messick, the template must have holes formed in its ends. Both, therefore, require additional fabricating steps to be performed on a flat template. In addition, neither of the aforementioned lathe duplicating systems are readily mountable on a multipurpose woodworking machine, such as that shown in the Edgemond, Jr., et al. U.S. Pat. No. 2,927,612, which can be set up to function as a lathe.

A disadvantage with free foot systems currently in use is that the tool holders are designed to hold a single, elongate cutting tool having a cutting edge of a predetermined shape, such as round or pointed. Consequently, in order to change the shape of the cutting edge, the entire cutting tool must be removed and replaced with one having the desired edge. Another disadvantage with tool holders of free foot systems is that they lack means for quickly and accurately aligning the cutting tool tip with the follower tip, or offsetting the cutting tool tip a predetermined amount from the follower tip.

Accordingly, there is a need for a lathe duplicating system of the free foot type in which the space between the table top and the rotational axis of the workpiece is unobstructed so that large diameter workpieces may be turned. There is also a need for a lathe duplicating system which is readily convertible to hold either a flat template or a three-dimensional model, and which accepts templates for face plate turning as well as spindle turning without requiring additional, modifying operations. Furthermore, there is a need for a lathe duplicating system which is readily attachable to a multipurpose woodworking tool. There is also a need for a tool support which provides for accurate and rapid alignment of the cutting tool and follower, and which does not require a plurality of separate cutting tools to provide a variety of cutting edge shapes.

SUMMARY OF THE INVENTION

The present invention is a lathe duplicating system which is specially designed to be used in combination with a multipurpose woodworking machine. The system is of the free foot type and includes a flat table mounted on a carriage adapted to be attached to the way tubes of a multipurpose woodworking machine, so that the table can be positioned as desired along the length of the way tubes between the headstock and tailstock. The table includes a rack assembly so that it may be adjusted in elevation relative to the carriage in order to position the tool holder at a predetermined elevation relative to the workpiece.

The duplicating system of the present invention also includes a pattern holding assembly which holds a template or model above the rotational axis of the workpiece, thereby increasing the clearance between the workpiece and the table. The holding assembly includes a channel which is supported by stanchions that are readily attachable to and detachable from the way tubes of the multipurpose woodworking machine. The channel is positioned to extend longitudinally of the machine and includes brackets which are capable of holding either a flat template or a three-dimensional model having the pattern to be duplicated.

In a preferred embodiment, the brackets each are pivotally connected to the channel, and include a clamp for engaging an end of a template and a spindle for engaging the end of a model. The clamp and spindle are positioned on the bracket so that the bracket can be pivoted to place either of them in position to engage the appropriate pattern.

The clamps are shaped to hold the ends of a flat template so that it extends parallel to the turning axis for spindle turning or perpendicular to the turning axis for face plate turning. Unlike many prior art devices, no additional components are required to modify the lathe duplicating system to accept flat templates, and the templates themselves need no special modification. Furthermore, a single bracket can be utilized for holding either a template or a three-dimensional model.

The system also includes a tool stand having a base which supports a follower and a cutting tool. The cutting tool is attached to a rod which is adjustably mounted on the base. The shank of the rod includes a circumferential V-groove which is engaged by a cone point set screw in the base for accurately and quickly positioning the rod so that the cutting tool tip is vertically aligned with the follower tip. The brackets are positioned such that the axes of the model and workpiece are vertically aligned, so by vertically aligning the cutting tool and follower, the turned workpiece will have the same diameter as the model.

If it is desired to offset the cutting tool from vertical alignment with the follower, and thereby vary the diameter of the turned workpiece from that of the model, the preferred embodiment includes an adjustment knob having a shank threaded into the base to abut the tool holding rod. Rotation of the knob displaces the bolt a predetermined distance relative to the base, so that when the tool rod is brought into abutment with the bolt end, the tool is displaced the same predetermined distance.

The preferred embodiment of the invention includes an insert guide adapted to be mounted on the cutting tool rod for securing a cutting tool having a plurality of cutting edges. The cutting tool is pivotally mounted on the tool rod so that it can be pivoted to present a desired cutting edge to the workpiece, and the insert guide has a shape to engage a cutting tool to prevent it from wobbling or pivoting when cutting a workpiece.

The preferred embodiment also includes a transparent shield which attaches to the channel by brackets. The brackets are positionable along the channel and the shield is shaped to deflect chips during face plate turning as well as spindle turning.

Accordingly, it is an object of the present invention to provide a lathe duplicating system which is readily attachable to and detachable from a multipurpose woodworking machine; a lathe duplicating system in which the model or template is held in vertical alignment above the rotational axis of the workpiece, thereby increasing the clearance below the workpiece to allow for large diameter workpieces to be turned; a lathe duplicating system which includes a free foot-type tool holder having means for accurately positioning cutting tools of a variety of shapes relative to the follower and which is supported on a table that can be varied in elevation relative to the workpiece; a lathe duplicating system having a shield for deflecting chips which can be used both for face plate turning and spindle turning; and a lathe duplicating system which can accept templates for spindle turning and face plate turning without modification or the addition of components.

Other objects and advantages of the present invention will be apparent from the following description, the accompanying drawings, and the appended claims.

BRIEF DESCRIPTION OF THE DRAWINGS

FIG. 3 is a side elevational view in section of a bracket of the duplicating system shown in FIG. 1, shown holding the end of a flat template;

FIG. 4 is a side elevational view in section of the bracket of FIG. 3, pivoted to engage an end of a three-dimensional model;

FIG. 5 is a top plan view of the bracket shown in FIG. 3;

FIG. 6 is a detail of FIG. 2, showing an end elevation of a channel, nut and bracket with the channel and nut in section.

FIG. 8 is a perspective view of the table top and tool holder of the duplicating system of FIG. 1;

FIG. 9 is a top plan view of the follower shown in FIG. 7, with the shaft shown in section;

FIG. 10 is a section through the follower tip taken at line 10—10 of FIG. 9;

DETAILED DESCRIPTION OF THE PREFERRED EMBODIMENTS

Figure 1:
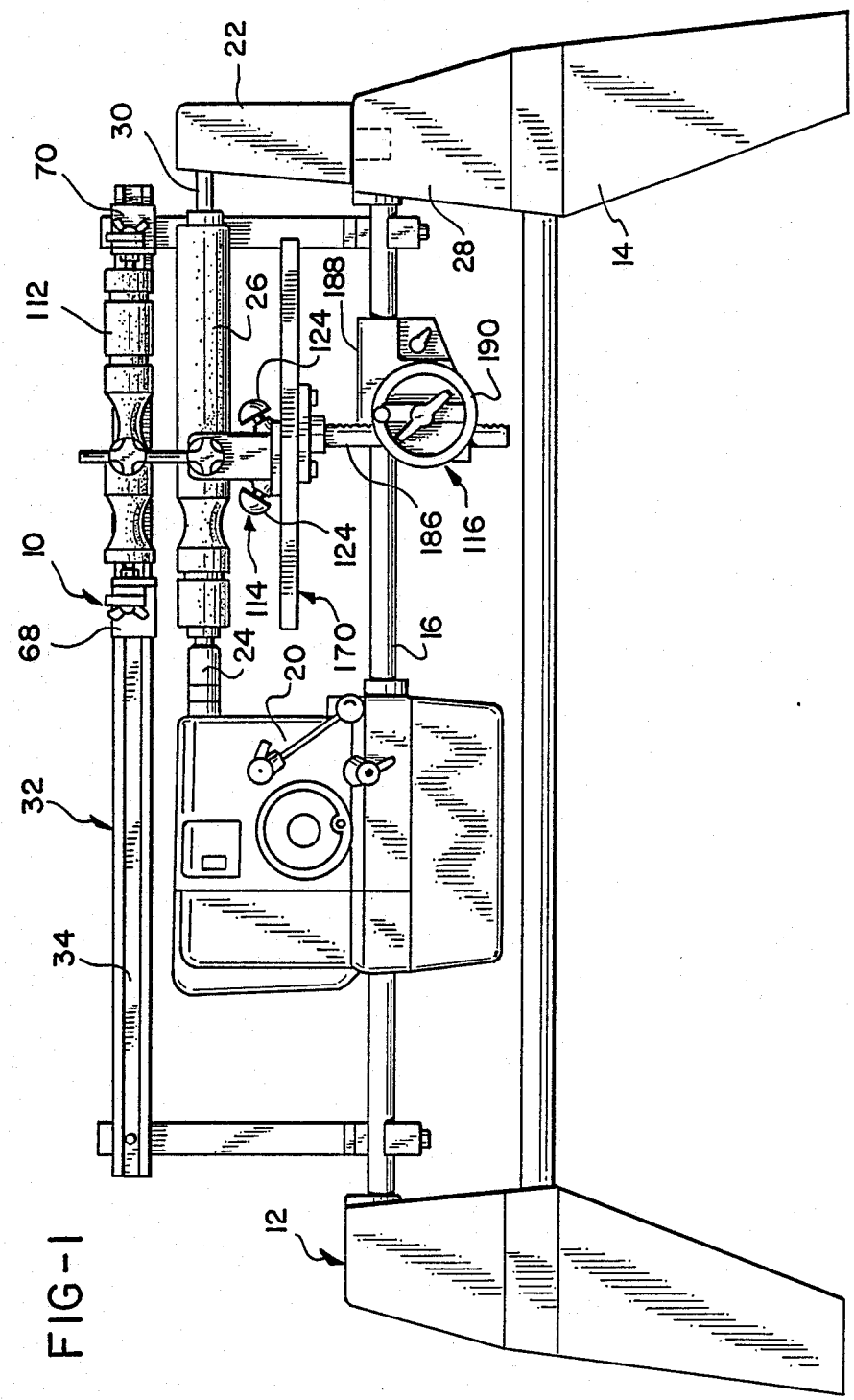
FIG. 1 is a side elevational view of a preferred embodiment of the duplicating system of the present invention, shown mounted on a multipurpose woodworking machine and supporting a three-dimensional model.

The duplicating system of the present invention, generally designated 10, is shown in FIG. 1 mounted on a multipurpose woodworking machine, generally designated 12. The multipurpose machine 12 includes a support frame 14, a pair of way tubes 16, 18 (see also FIG. 7), a headstock 20, and a tailstock 22. The headstock 20 includes a motor-driven quill spindle 24 which engages an end of a workpiece 26. The headstock is slidably positionable along the way tubes 16, 18 and can be varied in distance from the tailstock 22, which is mounted on the end 28 of the frame 14.

The tailstock 22 includes a spindle 30 which is positioned to engage an end of the workpiece 26. The details of the construction of the multipurpose tool 12 are explained in greater detail in the Edgemond, Jr., et al. U.S. Pat. No. 2,927,612, the disclosure of which is incorporated herein by reference.

Figure 2:
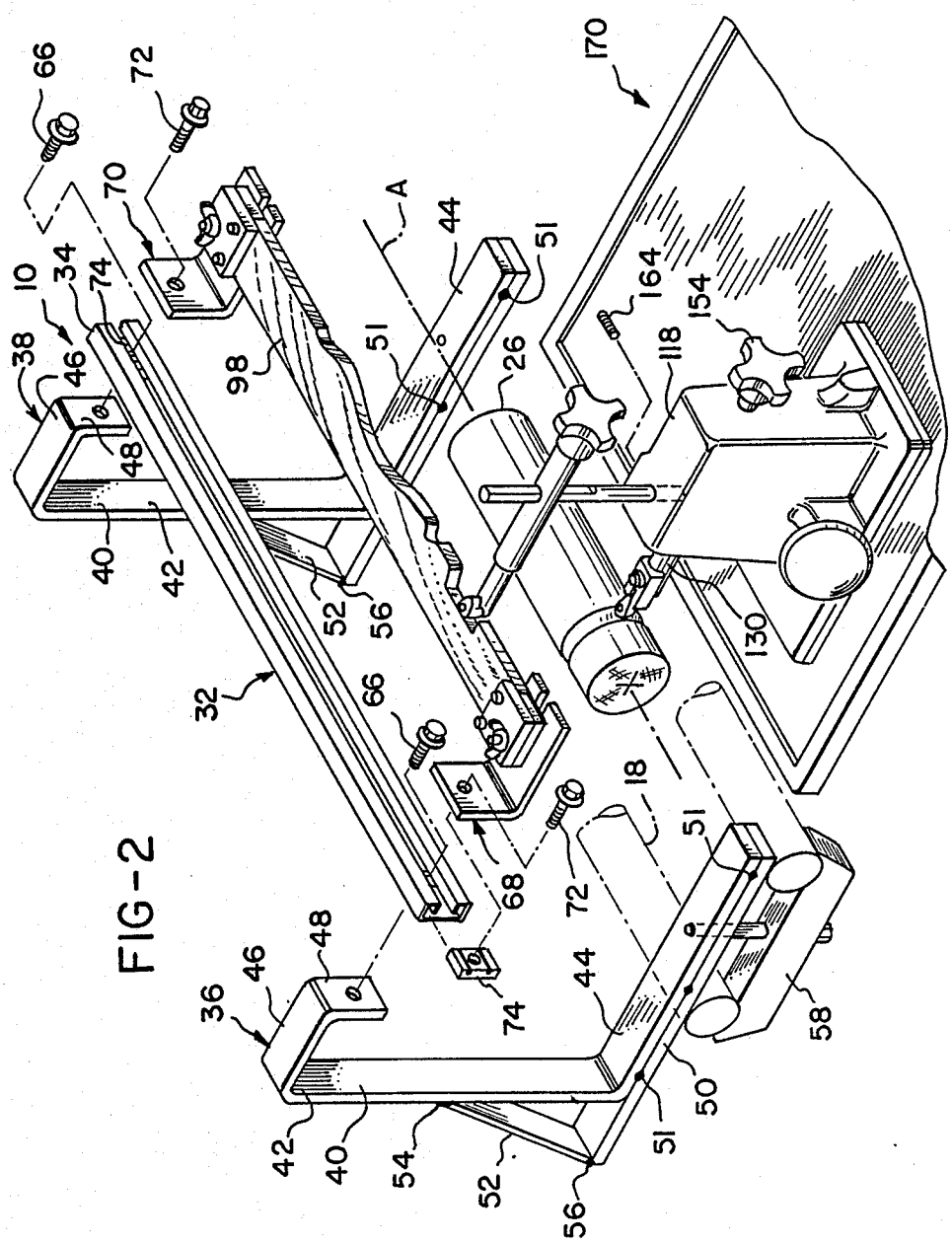
FIG. 2 is a detail of FIG. 1, showing a perspective, exploded view of the pattern support assembly holding a flat template.
Figure 7:
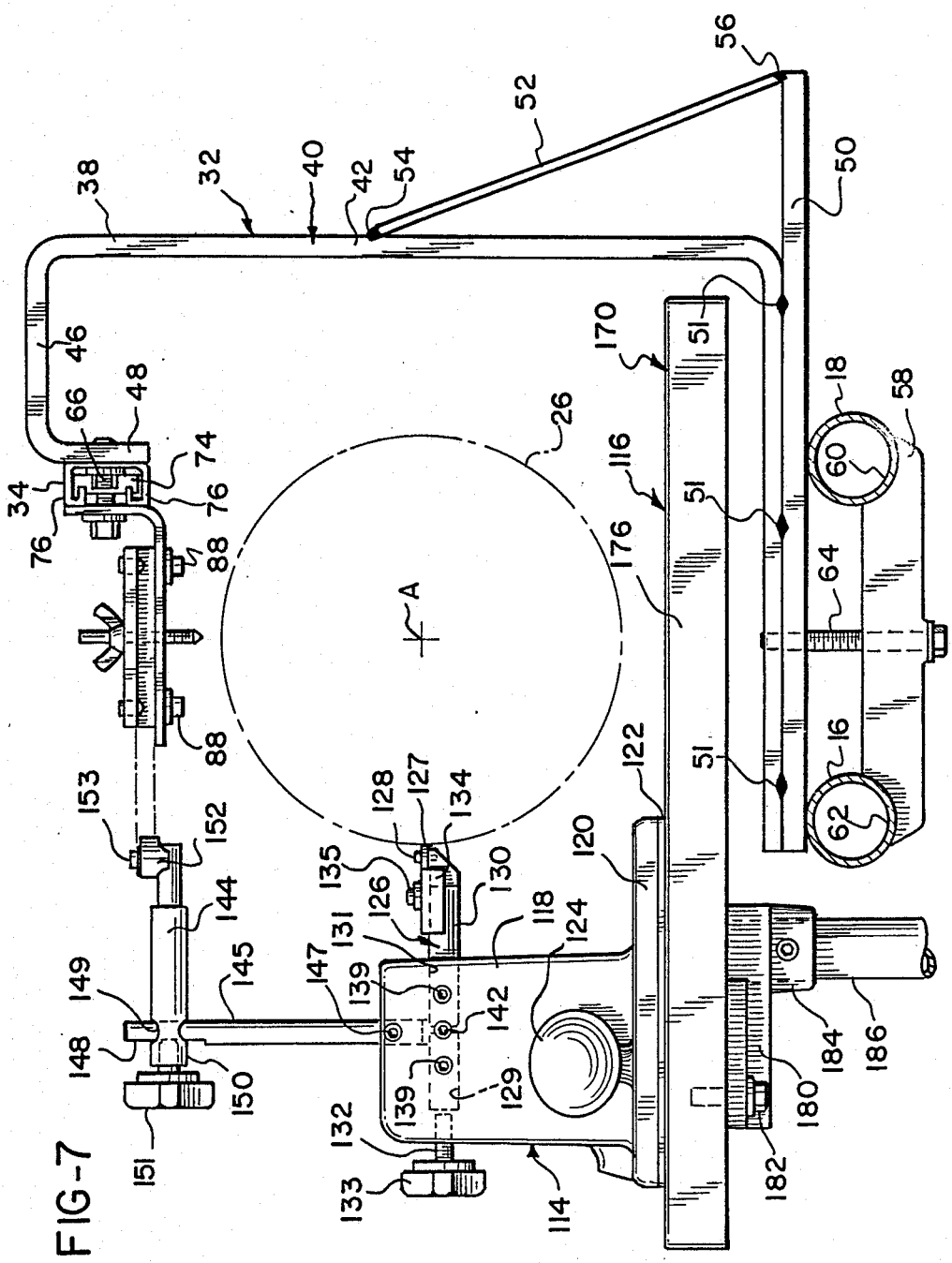
FIG. 7 is an end elevational view of the duplicating system of FIG. 1, showing the way tubes of the multipurpose machine in section.

As shown in FIGS. 1, 2 and 7, the system 10 includes a pattern support assembly, generally designated 32. The assembly 32 includes a Unistrut channel 34, having a generally C-shape in cross section (Unistrut is a registered trademark of GTE Products Corp., Wayne, MI). The channel 34 is supported at its ends by stanchions 36, 38. As best shown in FIG. 7, each of the stanchions 36, 38 includes a substantially L-shaped member 40 having an upper leg 42, a lower leg 44, a top member 46, and a lip 48 which depends downwardly from the top member.

The lower leg 44 is attached to a base plate 50 by weldments 51, and a strut 52 extends from the base plate to the upper leg 42. The strut 52 is attached to the upper leg 42 by weldments 54, and to the base plate 50 by a weldment 56.

The base plate 50 is attached to the way tubes 16, 18 by a mounting bar 58 having arcuate cutouts 60, 62 at its ends, shaped to receive the way tubes, and which is attached to the base by a mounting bolt 64 which threads through the base plate 50 and lower leg 44. Attachment of the pattern support assembly 32 to the way tubes 16, 18 is accomplished simply by placing the support assembly on top of the way tubes, then clamping the way tubes between the base plate 50 and mounting bar 58 by tightening the mounting bolt 64.

The channel 34 is attached to the lips 48 of the stanchions 36, 38 by cap screws 66. The upper legs 42 are sized such that the channel 34 is positioned well above the rotational axis A of the workpiece 26. As shown in FIGS. 2, 6 and 7, the channel 34 supports a pair of brackets 68, 70, each of which is attached to the channel by a bolt 72 and a Unistrut nut 74. The nuts 74 are slotted to engage the inwardly turned edges 76 of the channel 34.

The following description of the construction of the brackets 68, 70 will be directed to bracket 68, shown in FIGS. 3, 4, and 5, it being understood that it applies to bracket 70 as well. Bracket 68 includes a L-shaped angle 78 having an inner leg 80 and an outer leg 82. The inner leg 80 receives the bolt 72 which mounts the bracket 68 to channel 34. The outer leg 82 supports an intermediate plate 84 and an outer plate 86. The intermediate and outer plates 84, 86 are held against the outer leg 82 by a pair of cap screws 88.

The edge 90 of the intermediate plate 84 is recessed from the edges 92, 94 of the outer leg 82 and outer plate 86, thereby forming a slot 96. The slot 96 is shaped to receive an end of a flat template 98, with some minimal amount of clearance. The end of the template 98 is secured within the slot 96 by a pair of set screws 100.

The bracket 68 also includes a spindle 102 in the form of a pointed bolt 104 which is threaded through a hole 106 formed through the outer leg 82, intermediate plate 84, and outer plate 86. The bolt 104 can be adjusted relative to the outer leg 82 to space the point 108 a predetermined distance from the outer leg. The bolt 104 is locked into position by a wing nut 110 which is threaded on the end of the bolt and jammed against the outer plate 86.

The brackets 68, 70 can be pivoted about the bolt 72 relative to the channel 32 so that their slots 90 are positioned to receive an end of a template 98, as shown in FIGS. 2 and 3, or so that the point 108 of the spindle 102 is positioned to engage the end of a three-dimensional model 112, as shown in FIGS. 1 and 4. The brackets 68, 70 are secured in place by tightening the screws 66 into the nuts 74.

As shown in FIGS. 1, 7 and 8, the duplicating system 10 also includes a tool support, generally designated 114, and a support table assembly, generally designated 116. The tool support 114 includes a base 118 having a flat, plate-shaped foot 120. A pad 122 is attached to the underside of the foot 120, and is made of a low friction material such as ABS plastic (acrylonitrile-butadiene-styrene copolymer). A pair of handles 124 are attached to either side of the base 118 and the foot 120.

Figure 11:
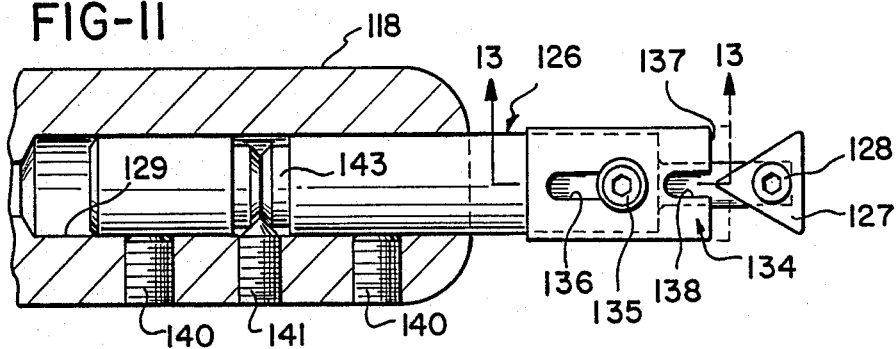
FIG. 11 is a detail of FIG. 8 showing a top plan view of the tool support, in which the base is in section.
Figure 12:
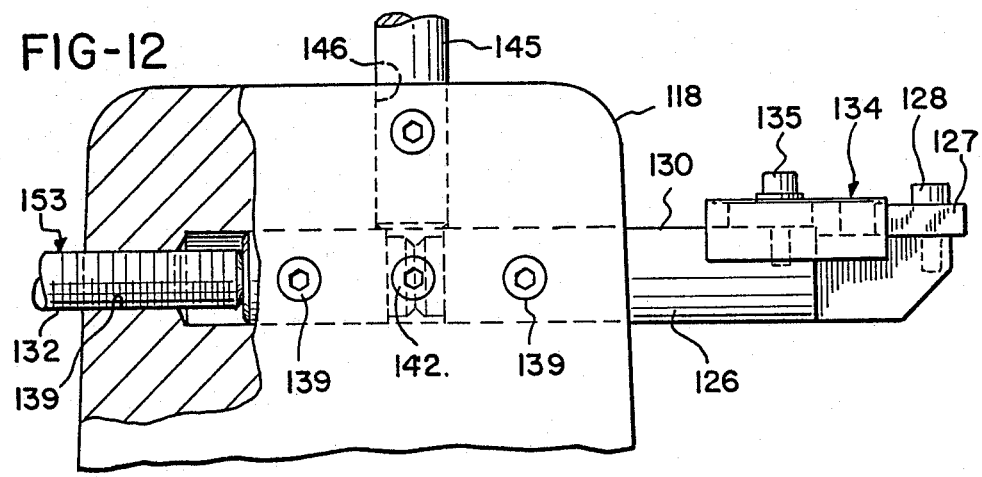
FIG. 12 is a side elevation of the detail of FIG. 11 showing the vertical shaft engaging the base, and in which the base is partially broken away.
Figure 13:
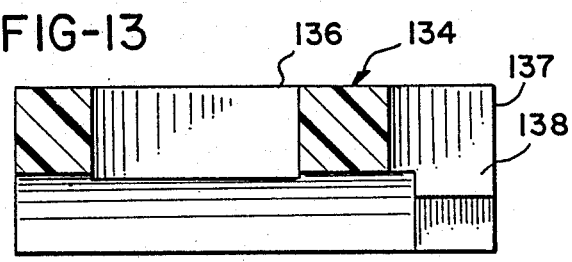
FIG. 13 is a side elevation in section of the insert guide, taken at line 13—13 of FIG. 11.
Figure 14:
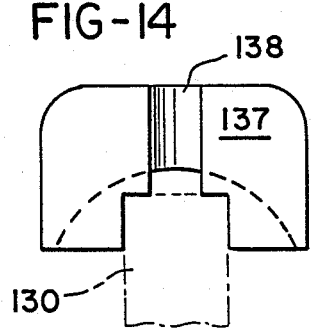
FIG. 14 is an end elevation of the insert guide of FIG. 13; showing the tool rod in phantom.

The base 118 supports a tool rod 126, also shown in FIGS. 11 and 12, having a cutting tool 127 attached to its end by a screw 128. The base includes a large horizontal base 129 which receives the shank 130 of the tool rod, and a small base 131 which is coaxial with base 129 and receives the threaded bolt 132 of a lock knob 133.

An insert guide 134 is attached to the shank 130 by cap screw 135. The guide 134 includes an oblong slot 136 which receives the screw 135 and a flat front face 137 with a recess 138. The front face 137 is shaped to abut the flat end, and the recess 138 is shaped to receive the pointed end of the tool 127, depending on whether the tool is positioned to present a pointed or flat cutting edge to the workpiece 26 (see FIG. 2). The underside 139 of the guide is concave in shape to rest upon the shank 130.

The slot 136 allows the guide 134 to be displaced slightly to permit the tool 127 to be rotated about its attaching screw 128 to present a different cutting edge to the workpiece. When the guide 134 engages the tool 127, as shown in FIG. 12, the tool is prevented from rotating during use and when the screw 128 is being tightened down against the tool to secure it to the shank 130. The guide 134 is shaped to secure tools having triangular, square, and diamond shaped cutting edges in this manner.

As shown in FIGS. 11 and 12, the tool rod 126 is locked into position by a pair of set screws 139 which are threaded into bores 140 formed in the side of the base 118. A bore 141 receives a cone point set screw 142 which engages a circumferential V-groove 143 formed in the shank 130 of the tool rod 126 at a location such that engagement of the V-groove by the set screw brings the cutting edge of the cutting tool 127 in proper vertical alignment with the outer edge of the follower tip.

However, should it be desired to position the cutting tool 127 out of vertical alignment with the follower tip, the cone point set screw 142 is backed out of the V-groove 143, and the tool rod is displaced to the desired location The tool rod 126 can then be locked into position by the set screws 139. The threaded bolt 132 of the lock knob 133 is formed with 16 threads per inch, so that a full rotation of the knob displaces the bolt 1/16th of an inch within the bore 131. Thus, the tool rod 126 can be accurately displaced a predetermined distance from vertical alignment with the follower by rotation of the lock knob 154 an appropriate number of turns.

A follower rod 144 is mounted on a vertical shaft 145 which is received within a vertical bore 146 in the base 118 and secured with a set screw 147. The upper portion of the shaft 145 includes a flat 148 and extends through a correspondingly-shaped hole 149 in the rod 144. The inner end of the follower rod 144 includes a threaded bore 150 that receives a locking knob 151. The locking knob can be tightened against the flat 148 to secure the follower rod 144 at a predetermined elevation relative to the tool rod 126.

As shown in FIG. 9, the follower rod 144 includes a flat, plate-shaped end which supports a pie-wedge-shaped tip 152, secured by a cap screw 153. The tip 152 can be pivoted to present either an arcuate surface or a pointed surface to the pattern. Consequently, a single tip 152 may be adjusted to correspond to either a rounded or a pointed cutting tool 127.

The support table assembly 116, best shown in FIGS. 1, 7, 8, and 15, includes a table, generally designated 170, having a flat plate 172 of laminated plastic attached to a table top 174 by contact cement, and a molded ABS (acrylonitrile-butadiene-styrene copolymer) frame 176 which is attached to the table top by a suitable adhesive. A pair of brackets 180 are attached to the underside of the table top 174 by screws 182 and include bosses 184 which support racked legs 186 (one assembly being shown in FIG. 15). The racked legs are received within a carriage 188 which is slidably displaceable along the way tubes 16, 18 of the multipurpose woodworking tool 12.

The structure of the carriage 188 is described in greater detail in the aforementioned Edgemond, Jr., et al. U.S. Pat. No. 2,927,612. The carriage 188 includes pinions which are rotated by a hand wheel 190 and are capable of being locked in position, so that the table top 174 and plate 172 can be adjusted in elevation relative to the way tubes 16, 18, thereby positioning the cutting tool 128 at the appropriate height for a particular workpiece 26.

Figure 18:
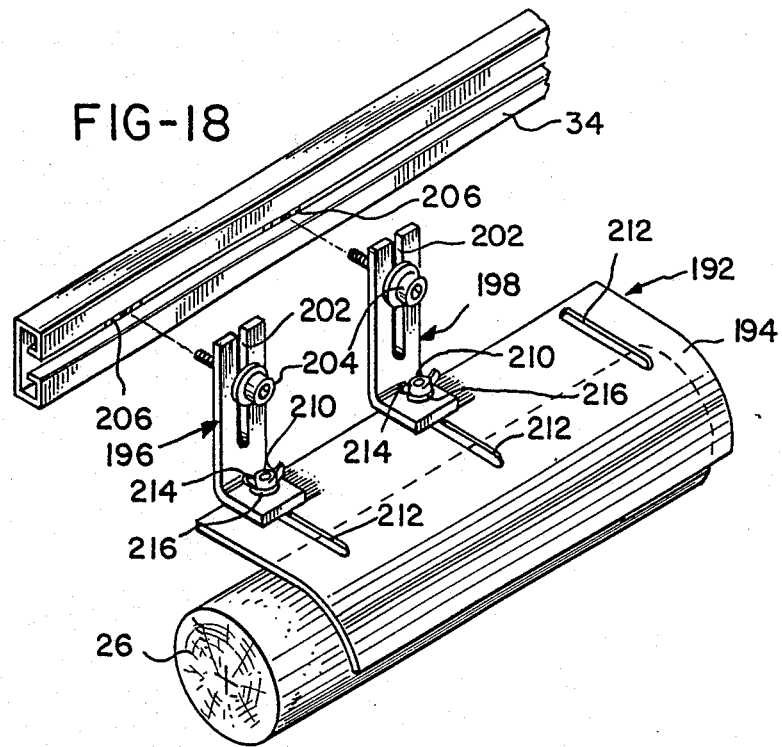
FIG. 18 is a detail of FIG. 17, showing a perspective view of the chip shield exploded from the channel.

The preferred embodiment of the system 10 includes a chip shield, generally designated 192, as shown in FIGS. 18 and 19. The chip shield 192 consists of an elongate, curved plate 194 made of a clear Lexan plastic (a polycarborate resin; Lexan is a trademark of General Electric Co., Pittsfield, MA), and a pair of brackets 196,198 attaching it to the channel 34.

The brackets 196,198 each consist of an L-shaped angle having an upper leg 200 with a slot 202 sized to receive a cap screw 204. The cap screws 204 each engage a Unistrut nut 206 positioned within the channel 34. The brackets each include a lower leg 208 having a hole (not shown) which receives a bolt 210 that passes through a slot 212 formed in the plate 194. The plate 194 is clamped under the lower leg 208 by wing nuts 214 and washers 216.

Figure 17:
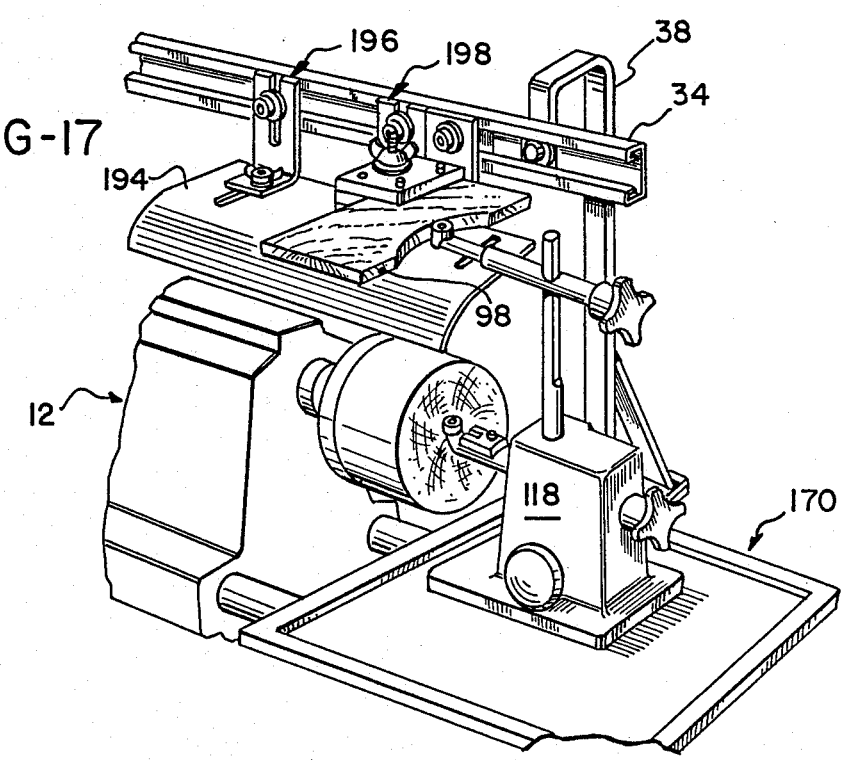
FIG. 17 is a detail of FIG. 16, modified to include a chip shield.

The cap screws 204 can be loosened to allow the brackets 196,198 to be positioned in the channel 34 as desired, and to allow the plate 194 to be raised or lowered relative to the workpiece 26, so that it can be positioned between the workpiece and the pattern 98, as shown in FIG. 17. The plate 194 is capable of adjustment toward or away from the channel 34 to accommodate workpieces of varying sizes.

To perform spindle turning, the duplicating system 10 is set up as shown in FIG. 1. If a model 112 is to be used, the brackets 68, 70 are positioned relative to the channel 34 so that the spindles 102 extend substantially horizontally, as shown in FIG. 4. The spindle points 108 engage the centers of the ends of the model 112, and the brackets 68, 70 are positioned on the channel so that the model is vertically aligned with the workpiece 26.

The support table assembly 116 is adjusted so that the plate 172 supports the tool support 114 to align the cutting tool 130 properly with the workpiece 26. The follower rod 132 is positioned on the vertical shaft 138 so that the follower 134 properly engages the model 112. In the example shown in FIG. 1, it is desirable that the follower be aligned with the central axis of the model 112.

To begin the spindle turning operation, the motorized headstock 20 is actuated to rotate the quill spindle 24, thereby rotating the workpiece 30. The handles 124 of the tool support 114 are grasped by the operator, and the tool support 114 is slid on the plate 172, thereby bringing the cutting tool 128 in contact with the workpiece 26 and the follower 134 into contact with the contour of the model 112. The tool support 114 preferably is moved from left to right, as shown in FIG. 1, making successive passes along the contour of the model until the contour of the workpiece 26 is identical to that of the model 112.

If a flat template 98 is to be used, the brackets 68, 70 are rotated to bring the slots 90 in position to engage the ends of the template 98, as shown in FIGS. 2, 3, and 7. The follower rod 132 is positioned such that the follower tip 152 may engage the contour of the template 98, and the spindle turning process proceeds in a fashion similar to that for using a model 112.

Figure 16:
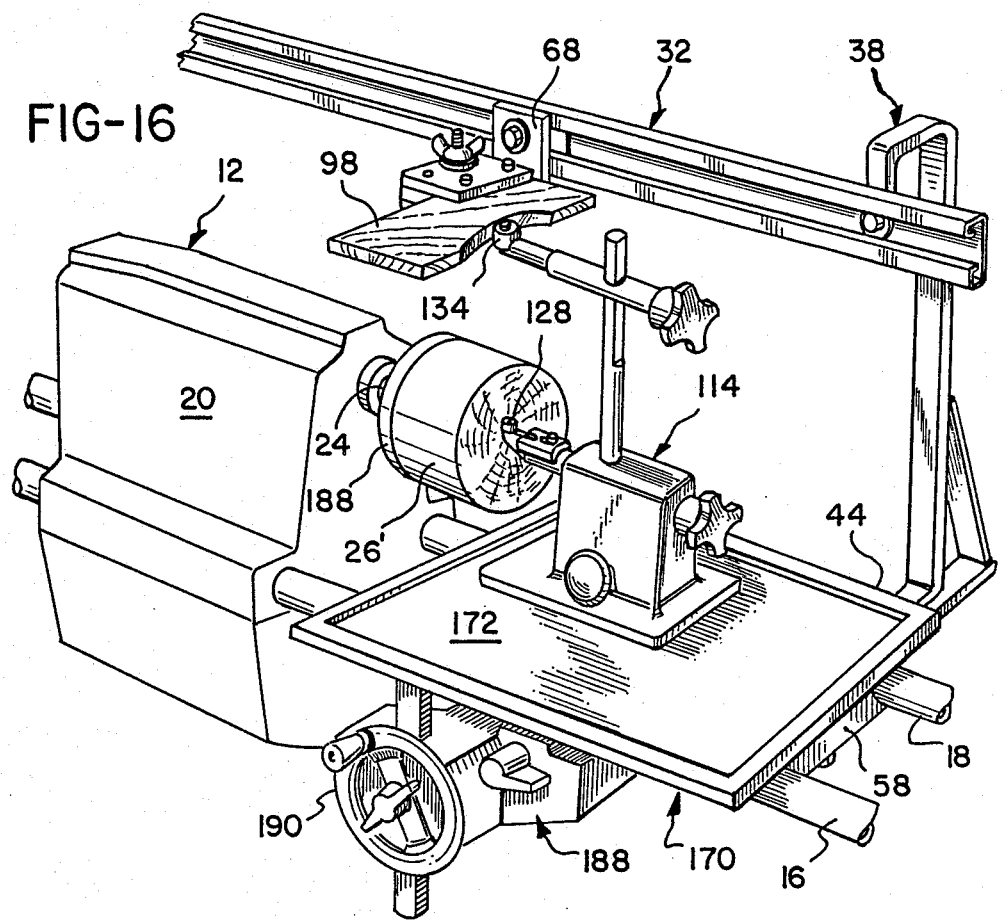
FIG. 16 is a detail of FIG. 1, showing a perspective view of the lathe duplicating system modified for face plate turning.
Figure 15:
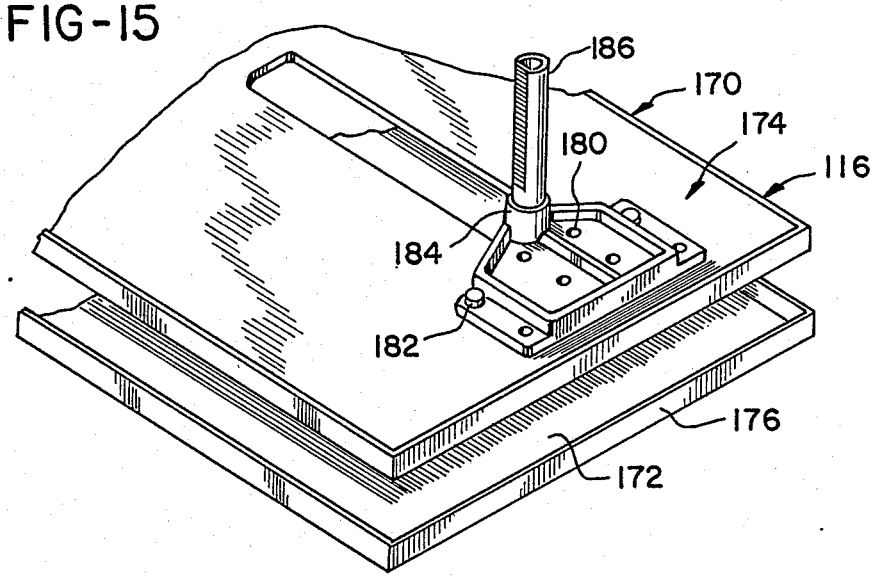
FIG. 15 is a detail showing a perspective, exploded view of the underside of the table of FIG. 7.

The arrangement for performing face plate turning is shown in FIG. 16. For face plate turning, a workpiece 26' is mounted on a face plate 218 that is attached to the quill spindle 24 of the headstock 20. The workpiece 26' typically is cylindrical in shape, and may be solid. A flat template 98' having the desired pattern is utilized and is held in a single bracket 68.

The table 170 is adjusted relative to the carriage 188 so that the cutting tool 127 is substantially level with the rotational axis of the workpiece 26'. The follower tip 152 is positioned so that it engages the contour of the template 98'.

The headstock 20 is now actuated to rotate the workpiece, and the tool support 114 is grasped by the operator and moved inwardly toward the workpiece 26' to perform the cutting operation. It is desirable to move the cutting tool 128 from the outside periphery of the workpiece 26' toward the center and, for a workpiece 26' being rotated in a counterclockwise fashion, the cutting tool 128 should be moved from the left to the right, so that the workpiece is being urged downwardly against the cutting edge of the tool 127 at all times.

While the forms of apparatus herein described constitute preferred embodiments of this invention, it is to be understood that the invention is not limited to these precise forms of apparatus, and that changes may be made therein without departing from the scope of the invention.

What is claimed is:

1. A lathe duplicating system comprising:
   means for supporting a pattern to be duplicated;
   table means for supporting a cutting tool; and
   tool support means for holding a cutting tool, said support means including a base adapted to slidably engage said table means, follower means for engaging a pattern including a shaft attached to and extending vertically from said base and having a flat formed on an upper end thereof, a follower rod having a hole to receive said upper end therethrough and extending outwardly therefrom, a follower tip mounted on an end of said rod having arcuate and pointed contours for engaging a pattern, a follower lock knob threaded into said follower rod and displaceable to jam against said flat of said shaft such that said follower rod is selectively positionable therealong, a tool rod having a tool at an end thereof, a shank having a circumferential V-groove therearound and a flat on an upper surface thereof, a bore shaped to nonrotatably receive said tool rod such that it extends outwardly from said body below said follower rod, a tool mounted on an end of said tool rod, a cone point set screw threaded into said body and positioned to extend into said bore to engage said groove only when said tool is vertically aligned with said follower tip, a lock knob having a shank threaded into said body and being colinear with said tool rod, whereby displacement of said knob shank by a predetermined increment allows said tool rod to be displaced by an increment substantially identical to said predetermined increment.

2. A lathe duplicating system comprising:
means for supporting a pattern to be duplicated;
table means for supporting a cutting tool;
tool support means for holding a cutting tool, said support means including a base adapted to slidably engage said table means, follower means attached to and extending above said base and including a tip for engaging a pattern, a tool rod slidably engaging said base and extending outwardly therefrom, a cutting tool attached to an outer end of said tool rod, means for accurately positioning said tool rod relative to said base such that said cutting tool is vertically aligned with said follower tip; and
insert guide means for engaging said cutting tool to prevent rotation thereof during a turning operation, said insert guide means being slidably positionable along said tool rod toward and away from said cutting tool whereby clearance may be provided to allow said cutting tool to be pivoted on said tool rod.

3. A lathe duplication system comprising:
means for supporting a pattern to be duplicated;
table means for supporting a cutting tool;
tool support means for holding a cutting tool, said support means including a base adapted to slidably engage said table means, follower means attached to and extending above said base and including a tip for engaging a pattern, a tool rod slidably engaging said base and extending outwardly therefrom, a cutting tool attached to an outer end of said tool rod, means for accurately positioning said tool rod relative to said base such that said cutting tool is vertically aligned with said follower tip;
said cutting tool being pivotally attached to said tool rod and shaped to present either a substantially flat or a protruding rearward edge; and
said system further comprising insert guide means for engaging said cutting tool to prevent rotation thereof during a turning operation, said guide means including a substantially flat front face positioned to engage said flat rearward edge of said cutting tool, a recess formed in said front face shaped to receive said protruding rearward edge of said cutting tool therein, an elongated slot formed therethrough, and a screw extending through said slot and threaded into said tool rod, such that said insert guide means slidably positionable on said tool rod, whereby said insert guide means may be retracted from engagement with said cutting tool to allow said cutting tool to be pivoted on said tool rod.

4. A lathe duplicating system comprising:
means for supporting a pattern to be duplicated;
means for supporting a cutting tool;
tool support means for holding a cutting tool, said support means including a base, follower means attached to and extending above said base for engaging a pattern, a tool rod extending outwardly from said base, and a cutting tool pivotally attached to an outer end of said tool rod and shaped to present either a substantially flat or a protruding rearward edge; and
insert guide means for engaging said cutting tool to prevent rotation thereof during a turning operation, said insert guide means being slidably positionable along said tool rod toward and away from said cutting tool whereby clearance may be provided to allow said cutting tool to be pivoted on said tool rod.

5. The lathe duplicating system of claim 3 wherein said guide means includes a substantially flat front face positioned to engage said rearward edge of said cutting tool, a recess formed in said front face shaped to receive said protruding rearward edge of a cutting tool therein, an elongate slot formed therethrough, and a screw extending through said slot and threaded into said tool rod, such that said insert guide means is slidably positionable on said tool rod, whereby said insert guide means may be retracted from engagement with said cutting tool to allow said cutting tool to be pivoted on said tool rod.

6. A lathe duplicating system comprising:
means for supporting a pattern to be duplicated;
table means for supporting a cutting tool;
a base adapted to engage said table means in direct slidable contact therewith
means defining a bore in said base,
a tool rod slidably received in said bore and having an end thereof projecting outwardly therefrom;
a cutting tool,
means mounting said cutting tool on said outwardly projecting end of said tool rod;
follower means mounted on said base above said tool rod in substantial alignment therewith;
a follower tip mounted on an outer end of said follower means; and
means projecting into said bore and engaging said tool rod at a predetermined position therealong and vertically aligning said follower tip and said cutting tool.

7. A lathe duplicating system of claim 6 further comprising means defining a threaded bore coaxial with said tool rod receiving bore, and a lock knob having a threaded shank received in said threaded coaxial bore and engageable with an end of said tool rod opposite said outwardly projecting end thereof.

8. The lathe duplicating system of claim 6 wherein said follower means includes a shaft received in said base, projecting upwardly therefrom substantially perpendicularly to said tool rod, and a follower rod projecting outwardly from said shaft in substantial alignment with said tool rod and carrying said follower tip on an outer end thereof.

9. A lathe duplicating system of claim 6 further comprising insert guide means for engaging said cutting tool and preventing rotation thereof during a turning operation.

10. The lathe duplicating system of claim 9 wherein said insert guide means is mounted on said tool rod rearwardly of said cutting tool and includes a substantially flat front face positioned to engage a rearward edge of said cutting tool.

11. The lathe duplicating system of claim 9 wherein said cutting tool includes a protruding rearward edge and said insert guide means includes a front face having a recess shaped to receive said protruding rearward edge therein.

12. A lathe duplicating system comprising:
means for supporting a pattern to be duplicated;
table means for supporting a cutting tool;
a base adapted slidably to engage said table means,
means defining a bore in said base,
a substantially cylindrical tool rod slidably received in said bore and having an end thereof projecting outwardly therefrom;
a cutting tool,
means mounting said cutting tool on said outwardly projecting end of said tool rod;
follower means mounted on said base above said tool rod in substantial alignment therewith;
a follower tip mounted on an outer end of said follower means; and
a pointed screw received in a threaded bore intersecting said tool rod receiving bore;
said screw projecting into said tool rod receiving bore and engaging said tool rod at a circumferential groove formed in said tool rod at a predetermined position therealong and vertically aligning said follower tip and said cutting tool.

* * * * *